United States Patent

Mao

[15] 3,647,545
[45] Mar. 7, 1972

[54] BATTERY ELECTRODE GRIDS MADE FROM TIN-LITHIUM-LEAD ALLOY

[72] Inventor: George W. Mao, St. Paul, Minn.

[73] Assignee: Gould-National Batteries, Inc., St. Paul, Minn.

[22] Filed: June 2, 1969

[21] Appl. No.: 829,745

[52] U.S. Cl................................136/26, 75/166 C, 75/166 D, 75/167, 136/65, 136/66, 29/2
[51] Int. Cl......................................C22c 11/02, H01m 35/02
[58] Field of Search...............75/166 C, 166 D, 167; 136/26, 136/65, 66; 29/2

[56] References Cited

UNITED STATES PATENTS

| | | |
|---|---|---|
| 1,745,721 | 2/1930 | Shoemaker........................75/167 A |
| 1,791,148 | 2/1931 | Shoemaker........................75/167 A |
| 1,808,793 | 6/1931 | Shoemaker........................75/167 A |
| 1,916,496 | 7/1933 | Shoemaker........................75/167 A |
| 1,926,545 | 9/1933 | Koch..................................75/167 A |
| 2,140,544 | 12/1938 | Osborg...............................75/167 A |
| 2,242,440 | 5/1941 | Shoemaker et al............75/167 A X |
| 2,272,181 | 2/1942 | Bouton et al....................75/167 A X |

Primary Examiner—Henry W. Tarring, II
Attorney—Stryker and Jacobson

[57] ABSTRACT

A grid supporting structure made of an alloy consisting of 0.05–0.5 percent tin, 0.02–0.03 percent lithium and balance lead which gives improved service in lead acid battery cells is described.

6 Claims, No Drawings

BATTERY ELECTRODE GRIDS MADE FROM TIN-LITHIUM-LEAD ALLOY

BACKGROUND OF THE INVENTION

In the prior art, numerous types of lead alloys have been developed in order to achieve desired electrical and physical characteristics. Lead has very desirable electrical characteristics that make it suitable as a primary material in the construction of storage battery grids. However, it is necessary to add different types of trace elements to lead in order to form alloys that have more strength than lead and are easier to cast. Pure lead is mechanically too weak to provide sufficient structural support without excessive weight. One prior art alloy which greatly improves the strength characteristics of lead is that of lithium and lead, which is known in the prior art and described in detail in Patent application Ser. No. 707970, filed Feb. 26, 1968, in the names of the present inventor and Henry J. Banas and assigned to the present assignee. The lithium-lead alloy is much stronger than lead alone and, yet, still preserves the electrical advantages of lead. However, lithium-lead alloy has been found to have some disadvantages which it was believed could be eliminated by further development. For example, lithium-lead alloy has a tendency to be corroded unevenly, experiencing greater oxidation and penetration at grain boundaries. In addition, lithium-lead alloy has a tendency to become brittle after two or three months of aging at room temperature. My invention was conceived in the search for an improvement to the lithium-lead alloy. My invention serves to alleviate the above-mentioned difficulties and, in addition, to provide numerous other advantages.

SUMMARY OF THE INVENTION

Briefly, the present invention comprises the addition of tin in the amount of about 0.05 percent to 0.5 percent to the lithium-lead alloy. It has been found that this improved alloy is less subject to oxidation along grain boundaries, is harder than the lithium-lead alloy alone, has a higher tensile strength than lithium-lead alloy, renders lithium-lead alloy easier to cast into structurally sound grids for storage batteries, and permits regulation of electrochemical formation products when used for battery grids.

DESCRIPTION OF THE PREFERRED EMBODIMENT

My new alloy is produced in a conventional manner by adding the correct quantities of tin and lithium to the molten lead and mixing until the mass is homogenous. For comparison purposes, a number of rods of lithium-lead alloy and tin-lithium-lead alloy were prepared for examination. Several rods of each alloy were prepared by melting at 700 degrees Fahrenheit and pouring the alloys into molds which were maintained at 350° F. Rods of each of the two compositions were used for corrosion tests. The rods were submerged in an acid solution and an equal current was maintained through the two samples. The weight loss of the rods was carefully measured and magnified photographs taken of the surface for a detailed examination. The tests demonstrated that the addition of tin to the lithium-lead alloy did not affect the weight loss but did promote more uniform corrosion with no tendency to penetrate along grain boundaries as is the case with lithium-lead alone. Detailed examination showed that the addition of tin to the lithium-lead alloy resulted in grain refinement such that oxidation was impeded along grain boundaries so as to result in uniform corrosion.

Additional tests were conducted with the two alloys to determine the hardness of the metals. Alloys employing the addition of tin were compared with other lithium-lead alloys in which sodium and calcium were added. The hardness of the samples was measured at the time the alloy was made and at a point in time several months later. It was discovered that not only does tin harden the alloy initially but also that tin-lithium-lead alloys do not lose their hardness after a period of time as the other alloys do. In addition, it was discovered that only alloys employing tin came out of the molds without blow holes in them. Thus, it is apparent that alloys of tin, lithium and lead are easier to cast. It was also discovered that, after a period of aging, lithium-lead alloys cast into grids such as used in storage batteries became brittle and cracked upon being bent. However, tin-lithium-lead alloys retained their strength over this period of time and did not crack upon being bent in a similar manner.

Measurements of the tensile strength indicated that the addition of tin to the lithium-lead alloy also increased its tensile strength and ductility. Extensive investigation of the tin-lithium-lead alloy has shown that the above advantages may be realized by a combination of the ingredients in certain definite proportions. The alloy is formed predominantly of lead. Lithium is added in the amount of 0.02 percent to 0.03 percent by weight. I have found that the addition of tin in the amounts of 0.05 percent to 0.5 percent by weight provides the best results. If the alloy in question is used in a battery as a grid, it is further important to note that the quantity of tin used will regulate the ratio of alpha to beta lead oxide formed by the electrochemical operation of the battery. Beta oxide is more desirable in batteries that are charged and discharged often, whereas the alpha type is preferred for steady use batteries, as is well known in the art. Thus, it can be seen that the addition of tin to a lithium-lead alloy for use in constructing storage battery grid plates is extremely advantageous and produces an alloy having superior electrical and mechanical characteristics for battery applications or other applications having similar requirements.

I claim:

1. For use in a lead-acid battery cell, an electrode comprising: a grid supporting structure having a layer of active material attached thereto, said grid consisting of an alloy of about 0.05 to 0.5 percent by weight tin, lithium in the range of about 0.02 percent to about 0.03 percent by weight and the remainder lead.

2. The invention as set forth in claim 1 wherein said alloy consists of about 0.35 percent tin by weight, about 0.02 percent lithium by weight and the remainder lead.

3. The invention as set forth in claim 1 wherein said grid structure is cast from a melt of said alloy.

4. A process for making a grid supporting structure for use in an electrode for a lead-acid battery, comprising the steps of:
   a. forming a melt consisting of tin in the range of about 0.05 percent to about 0.5 percent by weight, lithium in the range of about 0.02 percent to about 0.03 percent by weight and the remainder lead; and
   b. forming a supporting grid structure by casting the alloy melt in a suitable mold.

5. The process as set forth in claim 4 wherein the temperature of the melt is in the order of about 700° F.

6. The process as set forth in claim 4 wherein the mold temperature is maintained at a temperature in the order of about 350° F.

* * * * *